(12) United States Patent
Gates, II

(10) Patent No.: US 8,245,862 B2
(45) Date of Patent: Aug. 21, 2012

(54) ELECTRICAL BOX WITH RECESSED FACEPLATE

(76) Inventor: Clark H. Gates, II, Parowan, UT (US)

( * ) Notice: Subject to any disclaimer, the term of this patent is extended or adjusted under 35 U.S.C. 154(b) by 1252 days.

(21) Appl. No.: 10/494,857

(22) PCT Filed: Nov. 8, 2002

(86) PCT No.: PCT/US02/35791
§ 371 (c)(1),
(2), (4) Date: May 6, 2004

(87) PCT Pub. No.: WO03/043139
PCT Pub. Date: May 22, 2003

(65) Prior Publication Data
US 2004/0238197 A1 Dec. 2, 2004

Related U.S. Application Data

(63) Continuation of application No. 10/008,738, filed on Nov. 9, 2001, now Pat. No. 7,044,318.

(51) Int. Cl.
*H02G 3/08* (2006.01)
(52) U.S. Cl. ............. 220/3.94; 220/3.92; 220/3.8
(58) Field of Classification Search ............ 220/3.92, 220/3.94, 3.3, 4.02, 3.2, 3.5, 3.4, 3.8; 174/57, 174/66, 67
See application file for complete search history.

(56) References Cited

U.S. PATENT DOCUMENTS

| | | | |
|---|---|---|---|
| 2,531,737 A * | 11/1950 | Lyon, Jr. .................. 220/345.3 |
| 3,530,230 A | 9/1970 | Cormier | |
| 4,023,697 A * | 5/1977 | Marrero .................. 220/3.4 |
| 4,059,327 A | 11/1977 | Vann | |
| 4,090,769 A | 5/1978 | Damsky | |
| 4,918,259 A | 4/1990 | Hanson | |
| 4,936,794 A | 6/1990 | Shaw | |
| 4,988,832 A | 1/1991 | Shotey | |
| 5,257,946 A | 11/1993 | MacMillan | |
| 5,275,281 A | 1/1994 | Ebeling | |
| 5,387,761 A | 2/1995 | Simonis | |
| 5,574,256 A | 11/1996 | Cottone | |
| 5,975,323 A * | 11/1999 | Turan .................. 220/3.7 |
| 2004/0056035 A1 * | 3/2004 | Baker et al. ............. 220/345.1 |

* cited by examiner

*Primary Examiner* — Stephen Castellano
(74) *Attorney, Agent, or Firm* — Fehr Law Firm; Thompson E. Fehr

(57) ABSTRACT

An electrical box with recessed faceplate having a one-piece recessed faceplate (2) and adapted to accommodate a two-piece recessed faceplate (25). A rear portion (8) contains channels (9) on the top (5), bottom (6), and sides (7). A connecting wall (1503) attaches the rear portion (8) to the front portion (11). The connecting wall (1503) extends beyond the rear portion (8) and preferably contains one or more apertures (19, 20) to accommodate releasable fasteners such as screws (10). These apertures (19, 20) and the channels (9) assure that no screws (10) or analogous components or another type or releasable fastener are exposed within the box (1). The two-piece recessed faceplate (25) has an inner portion (45) and an outer portion (24) which slide along each other in order to enable the box (1) to be mounted at different distances from the mounting surface. Optionally, a removable cover (39) extends across the mouth (3) of the faceplate (2, 25). An extender (47) is also available for converting traditional electrical boxes (46) into a box that can accommodate a recessed faceplate (2, 25). And an alternative electrical box (600) holds switches (619) and is L-shaped.

12 Claims, 6 Drawing Sheets

ELECTRICAL BOX WITH RECESSED FACEPLATE

This application is a continuation of prior application Ser. No. 10/008,738, filed on Nov. 9, 2001 now U.S. Pat. No. 7,044,318.

TECHNICAL FIELD

This invention relates to boxes for containing the wide variety of electrical equipment that is traditionally installed within electrical boxes, such as receptacles, modular telephone jacks, stationary connectors for coaxial cables, switches, and the like.

BACKGROUND ART

Electrical equipment, such as receptacles, modular telephone jacks, stationary connectors for coaxial cables, switches, and the like is placed in the walls of almost all modern buildings. Into such devices, electrical connectors of various configurations can be removably inserted to provide a pathway for electricity to be supplied to such device to perform a variety of tasks, including powering an electrical appliance or carrying a signal for a telephone, computer, or television.

The standard faceplate for electrical instrumentalities, i.e., receptacles, modular telephone jacks, stationary connectors for coaxial cables, switches, and the like, is basically a planar device which fits closely against the exterior surface of the wall and is attached, directly or indirectly, to a standard electrical box. An electrical box is the metallic or plastic box which contains one or more electrical receptacles (usually two or four), modular telephone jacks, stationary connectors for coaxial cables, switches, or the like, i.e., electrical instrumentalities, that are permanently connected to the electrical wiring of the building.

Most electrical instrumentalities are connected with screws to the electrical box; the faceplate then is generally connected with screws or by snap-fitting to the electrical instrumentality and is thereby indirectly connected to the electrical box. Other electrical instrumentalities are attached to the faceplate, and the faceplate is directly connected with screws or by snap-fitting to the electrical box. In either case, one or more apertures, designated herein the instrumentality apertures, accommodate the portions of the electrical instrumentalities that are intended to be exposed.

Unlike a standard faceplate, a recessed faceplate, however, has only an edge which fits closely against the exterior surface of the wall; the portion of the recessed wall plate that is in the same plane as the exterior surfaces of the electrical outlets is some distance inward from the surface of the wall.

Recessed faceplates for receptacles, modular telephone jacks, stationary connectors for coaxial cables, and the like, i.e., electrical instrumentalities, provide the advantage that only the electrical cords, telephone lines, or cables of an electrical appliance (if the electrical connector that is physically associated with a particular electrical appliance is attached to a cord, line, or cable, rather than being directly connected to the appliance) will extend outward from the plane that forms the surface of a wall into which a receptacle, modular telephone jack, stationary connector for coaxial cables, or the like, i.e., an electrical instrumentality, has been mounted. And in the case of switches, nothing will extend beyond the plane of the wall.

Two sections of the National Electrical Code are especially important for an electrical box with a recessed faceplate.

Section 370-20 provides, "In walls or ceilings of concrete, tile, or other noncombustible material, boxes shall be installed so that the front edge of the box will not be set back of the finished surface more than ¼ in. (6.35 mm). In walls and ceilings constructed of wood or other combustible material, boxes shall be flush with the finished surface or project therefrom."

And section 410-56 (e) states, in pertinent part, "Faceplates shall be installed so as to completely cover the opening and seat against the mounting surface."

The present inventor is aware of a number of United States patents for electrical boxes with a recessed faceplate, viz., U.S. Pat. Nos. 4,059,327; 4,936,794; 4,988,832; 5,257,946; 5,387,761; and 5,574,256. None of these, however, have the ability to accommodate a recessed faceplate adapted to be extended so that, after installation of the box, the faceplate can be adjusted so that the faceplate meets the preceding requirements of the National Electrical Code; nor do they provide a mechanism for adapting a traditional electrical box to accommodate a recessed faceplate.

U.S. Pat. No. 4,059,327 just has a fixed bracket 20 and 24 against which a cover plate rigidly mounts in only one possible position. U.S. Pat. No. 4,936,794 simply has a recessed faceplate 26 rigidly attached to a tab 18 or 18a in only one possible position for a given embodiment of the box; and, in the embodiment using tab 18a, a slot 36 leaves an opening in the box, albeit on the outer side of the outlet. U.S. Pat. No. 4,988,832 employs a faceplate termed a bracket 12 rigidly attached to a stanchion 40, 42 in the box termed a housing 10 in only one possible position. U.S. Pat. No. 5,257,946 has a recessed cover plate 26 with a rear portion 48 that can be rigidly attached in only one possible position, with a screw, to the outlet, which is attached to the outlet box. U.S. Pat. No. 5,387,761 possesses a faceplate 36 that has a recess 42 that is only deep enough to accommodate a cover 54; the faceplate 36 can be rigidly attached to the electrical box 14 in only one possible position. And in the device of U.S. Pat. No. 5,574,256, the outlet 20 is attached to a recessed wall 16 that is an integral portion of the box 10; and the faceplate 30 mounts to the front of the box 10 in only one possible position.

Two of the preceding patents, viz., U.S. Pat. Nos. 4,988,832 and 5,387,761 include reclosable covers; U.S. Pat. No. 5,574,256 has a cover that is screwed in place; and U.S. Pat. No. 5,272,281 applies to an electrical outlet safety cover that is screwed in place. None of such covers, however, can be slid onto a faceplate.

Three patents, i.e., U.S. Pat. No. 3,530,230; U.S. Pat. No. 4,090,769; and U.S. Pat. No. 4,918,259 are, though known for modifying electrical boxes that have already been installed.

U.S. Pat. No. 3,530,230 discloses two embodiments. The first has an outer frame member 12 and a cover plate 14; the second, an outer frame 40 and a cover plate 46. In both embodiments, however, there is a gap between the walls 18, 42 and the electrical box 30, 64. The distance between the cover plate 14, 46 and the outer frame 12, 40 is only discretely (not continuously adjustable); the outer frame 12, 40 isn't fastened to anything; and, if the frame member 12 is flush against the wall, the cover plate 14 may not even touch the outlet because the distance between scoring of the tabs 20 may create a stop for the back of the cover plate 14 that is some distance in front of the outlet.

The device of U.S. Pat. No. 4,090,769 just plugs into an existing outlet, does not extend the electrical box, and has no indication that distance it extends from the existing electrical box is adjustable.

And U.S. Pat. No. 4,918,259 explicitly indicates that it does not extend the electrical box by stating, "The intent of the present invention is not to extend the receptacles, but rather to extend the cover . . . ." Moreover, the distance between the face of the cover frame 36 and the outlet is only discretely (not continuously) adjustable; and the cover frame 36 does not screw into place.

Finally, no electrical box is known to the Inventor wherein switches are mounted so that, upon installation, the faces of the switches will be other than generally in the same plane as the wall of the building in which the electrical box is located.

DISCLOSURE OF INVENTION

The present invention includes both a new electrical box with a recessed faceplate and an electrical box with a recessed faceplate that is created by modifying a traditional electrical box.

Both have a one-piece faceplate; but the new electrical box is also designed to accommodate a two-part faceplate which permits adjusting the distance between the outward surface of the electrical instrumentality installed within the electrical box and the flange at the front of the faceplate so that, after installation of the box, it can be assured that the flange of the faceplate will be flush against the wall in which the electrical box has been installed and that a wall of the faceplate will be flush against the outward surface of the installed electrical equipment, thereby meeting, in a relatively easy fashion, the previously cited portions of the National Electrical Code.

Furthermore, no screws or other components of a releasable fastener not employing screws are exposed in any of the versions of the electrical box; and once the electrical instrumentality is installed within the box, there are no openings in the electrical box.

The preceding is basically accomplished by enlarging both the height and width of the mouth of the electrical box as well as adding threaded channels to the sides of the electrical box.

An extender is used with a traditional electrical box to create the ability to install electrical instrumentalities within the assembled electrical box in a recessed aspect while still insuring that the assembled box extends sufficiently close to the finished surface of the wall in which the electrical box has been installed to meet the relevant portions of the National Electrical Code.

Optionally, a sliding cover may be removably attached over either the one-piece or the two-piece recessed faceplate.

An additional embodiment is a new electrical box for one or more switches wherein the switches are to be oriented so that upon installation the faces of the switches will be other than parallel to the wall of building in which the electrical box is placed.

MODES FOR CARRYING OUT THE INVENTION

Figure 1:
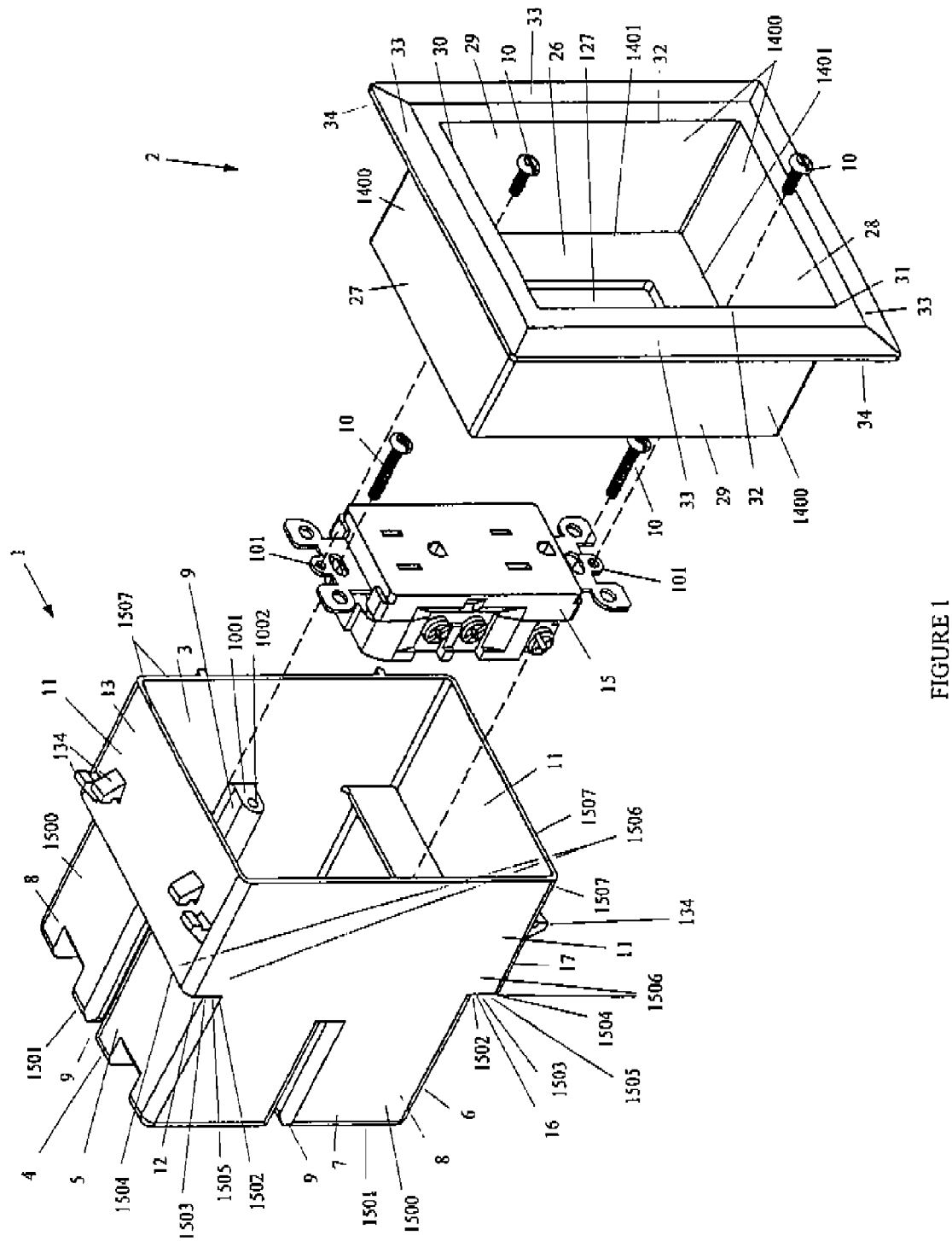
FIG. 1 illustrates an Electrical Box with Recessed Faceplate having a one-piece box recessed faceplate but designed to accommodate a two-piece recessed faceplate.

The Electrical Box with Recessed Faceplate having a one-piece recessed faceplate but designed to accommodate a two-piece recessed faceplate has, as illustrated in FIG. 1, a box (1) into which a one-piece recessed faceplate (2) is removably inserted.

The box (1) has an open front or mouth (3) and a closed back (4), although the rear wall (4) contains the knock-out tabs that are well known in the art for creating openings through which wiring can pass.

Attached to and projecting generally forward from the rear wall (4) is a lateral surface (1500) that connects the perimeter (1501) of the rear wall (4) to a first end (1502) of a connecting wall (1503) which connecting wall (1503) extends generally outward from, and preferably, perpendicular to, the lateral surface (1500). Attached to and projecting generally forward from the second end (1504) and from the sides (1505) of the connecting wall (1503) is the first end (1506) of the front portion (11). The second end (1507) of the front portion (11) forms the mouth (3) of the box (1).

The top (5), bottom (6), and sides (7) of the rear portion (8) of the box (1) each contain a channel (9) extending into the box (1) to accommodate a releasable fastener, preferably a screw, (10), with each channel (9) extending toward the back (4) of the box (1) and preferably being generally centrally located across the top (5), bottom (6), and each side (7) of the box (1). In the embodiments of FIGS. 1 through 4, the top (5), bottom (6), and sides (7) of the rear portion (8) of the box (1) comprise the lateral surface (1500).

Figure 2:
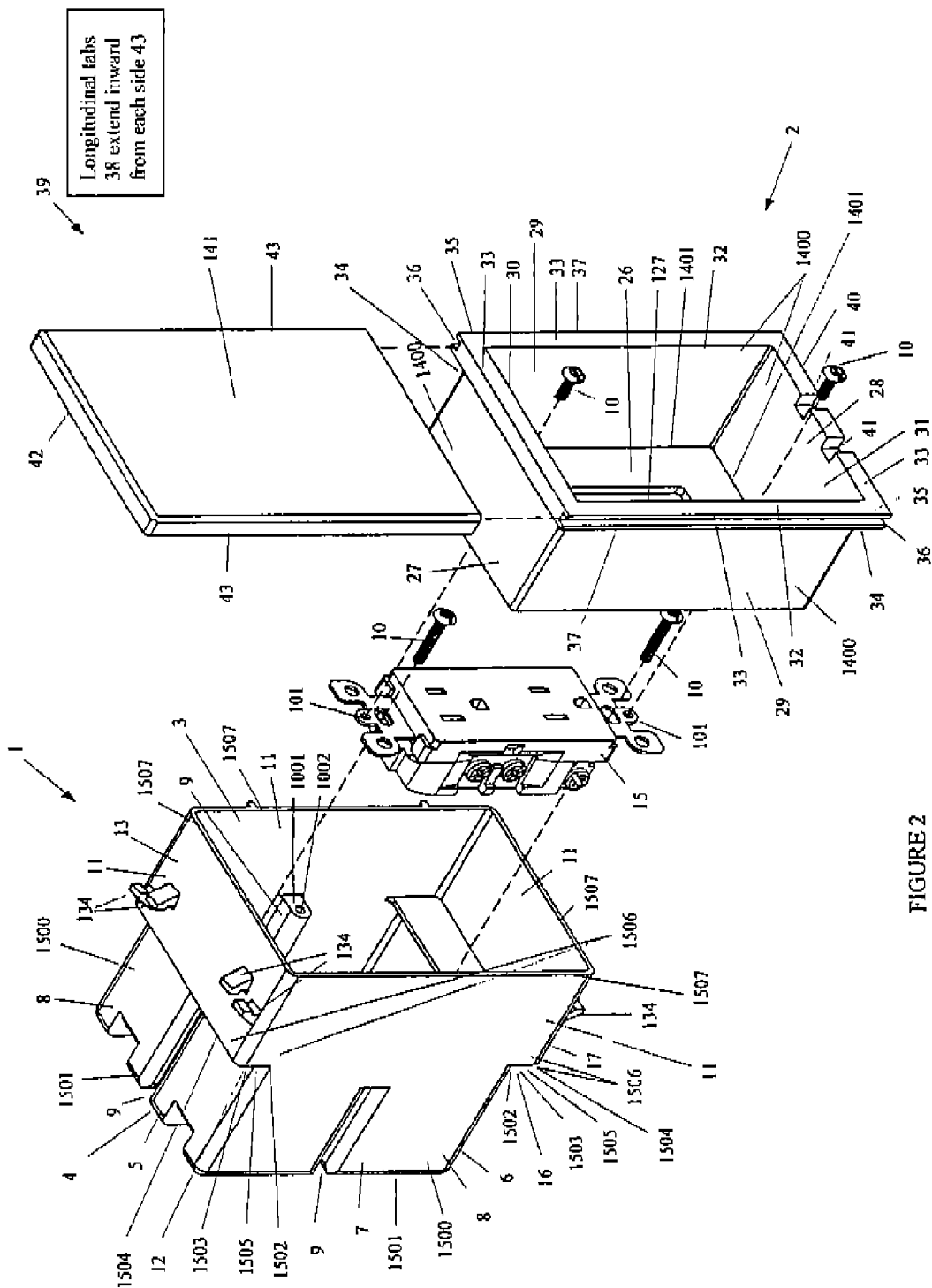
FIG. 2 is the same embodiment as that of FIG. 1 with the addition of a sliding cover.

In the preferred embodiment, the box (1) has a rectangular cross section. As illustrated in FIG. 1 and FIG. 2, the front portion (11) of the box (1) extends beyond the top (5) and beyond the bottom (6) of the rear portion (8). A top wall (12) that is preferably generally parallel to the front (3) and the back (4) of the box (1) runs from the top (5) of the rear portion (8) to the top (13) of the front portion (11) of the box (1) and between the sides (7) of the box (1). Similarly, a bottom wall (16) that is preferably generally parallel to the front (3) and the back (4) of the box (1) runs from the bottom (6) of the rear portion (8) to the bottom (17) of the front portion (11) of the box (1) and between the sides (7) of the box (1). Thus, in the preferred embodiment, the connecting wall (1503) is comprised of the top wall (12) and the bottom wall (16) and sides (7) which are integrally formed with the sides (7) of the rear portion (8) and the sides (7) of the front portion (11) of the box (1).

As suggested above, the interior ends (1001) of the channels (9) lie within the front portion (11) of the box (1); such ends (1001) are preferably covered except for a threaded aperture (1002) in such ends (1001) and are preferably all substantially aligned with one another.

The channels (9) and, in the preferred embodiment, the threaded apertures (1002) of the upper and lower channels (9) are used either to attach an electrical instrumentality (15) or a faceplate to the box (1). Whether the attachment is for an electrical instrumentality (15) or a faceplate is determined by whether the electrical instrumentality (15) is intended to be attached to the faceplate or directly to the box (1). This is the same situation as for traditional electrical boxes. If the electrical instrumentality (15) is intended to be attached directly to the box (1), the threaded apertures (1002) of the upper and lower channels (9) each accommodate a screw (10) for holding the electrical instrumentality (15) to the box (1), as illustrated in FIG. 1 through FIG. 4. Otherwise, the threaded apertures (1002) of the upper and lower channels (9) would be available to retain a screw (10) for holding the faceplate to the box (1).

Furthermore, as is the case with traditional faceplates, attachment of an electrical instrumentality (15) to a faceplate can be permanent or releasable, at least when the faceplate is intended to be attached directly to the box (1).

Retention of faceplates, whether one-piece or two-piece, to electrical boxes (1) is, as indicated above, preferably done with screws (10), as illustrated in FIG. 1 through FIG. 4, since screws tend to pull the faceplate against the mounting surface. However, the only essential feature is that a releasable fastener be used to hold the faceplate either directly to the box (1) or indirectly to the box (1) by having the faceplate directly attached, with a releasable fastener, to an electrical instrumentality (15) that is, itself, directly connected to the box (1) with a releasable fastener. Thus, for example, any type of snap-fit for a faceplate to the box (1) or to the electrical instrumentality (15) that is well known in the art may be employed.

For the embodiments depicted in FIG. 1 through FIG. 4, the top wall (12) contains an aperture (19) to accommodate a screw (10) that extends through the top wall (12) outside the box (1). Similarly, the bottom wall (16) contains an aperture (20) to accommodate a screw (10) that extends through the bottom wall (16) outside the box (1) for the same purpose as the aperture (19). Apertures (19, 20) accommodate screws (10) which are used to attach faceplates to the type of electrical instrumentality (15) depicted in FIG. 1 through FIG. 4, using threaded aperture (101) of the electrical instrumentality (15). For different electrical instrumentalities, however, the number and location of apertures for attaching a faceplate to an electrical instrumentality (15) depend upon particular electrical instrumentality (15) that is utilized.

Figure 3:
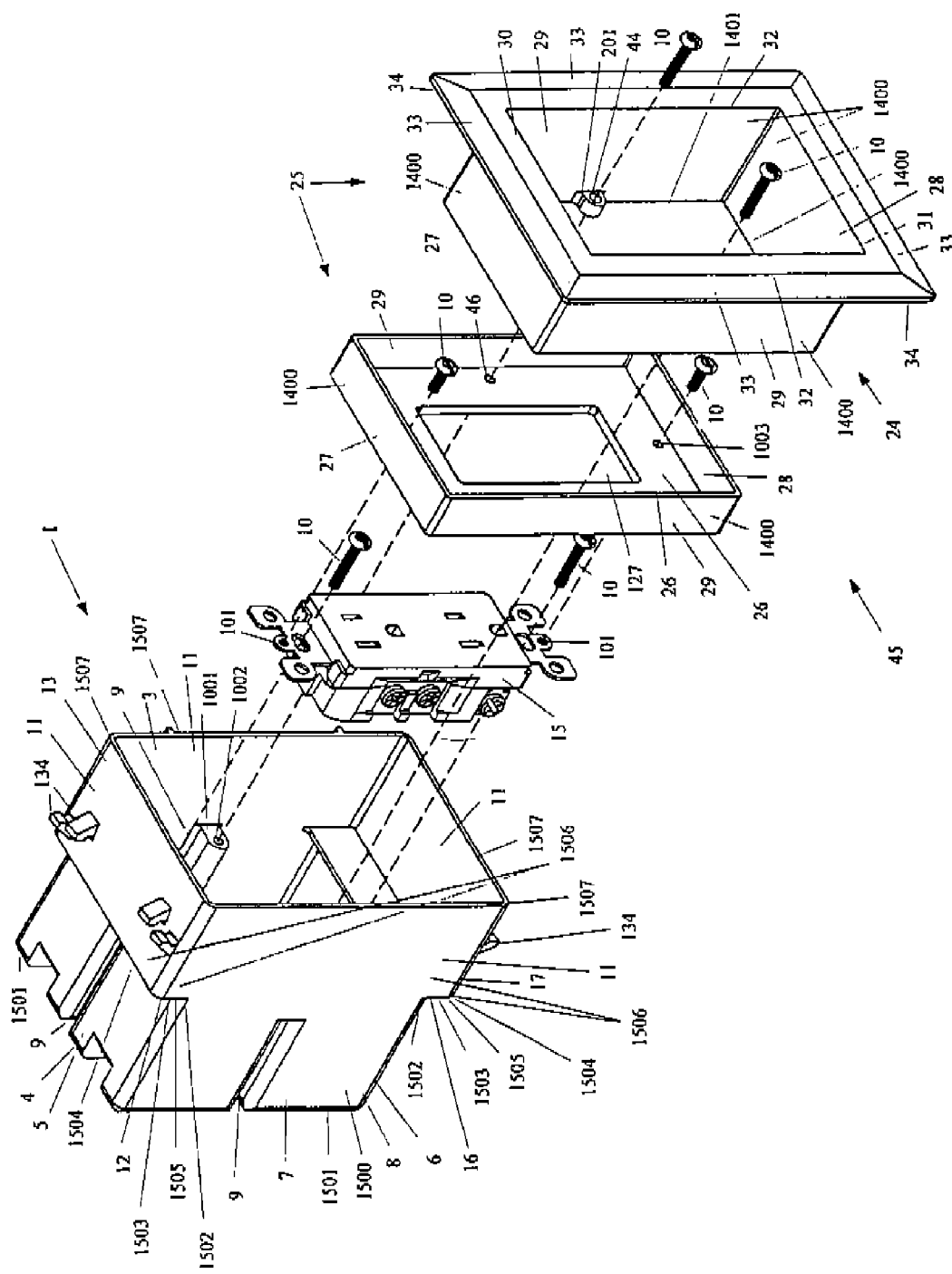
FIG. 3 depicts an Electrical Box with Recessed Faceplate having a two-piece recessed faceplate.

The channels (9) on the sides (7) of the box (1) and their associated threaded apertures (1002) accommodate screws (10) to draw toward the box (1) and retain the outer portion (24) of a two-piece recessed faceplate (25), as shown in FIG. 3.

The one-piece recessed faceplate (2) has a rear wall (26) containing one or more instrumentality apertures (127) to accommodate the electrical instrumentality (15). Attached to and projecting generally forward from the rear wall (26) is an interior surface (1400) that connects the perimeter (1401) of the rear wall (26) to a flange (33). The rear wall (26) has substantially the same shape as does the cross section of the front portion (11) of the box (1). In the case of a box (1) having a traditionally rectangular cross section, as depicted in FIG. 1 and FIG. 2, the interior surface (1400) comprises a top (27), bottom (28), and two sides (29) attached to one another so as to form a four-sided object. To the front (30) of the top (27), the front (31) of the bottom (28), and the front (32) of the two sides (29) is attached a flange (33), the back side (34) of which flange (33) is designed to seat against the mounting surface. The faceplate (2) has, in comparison to the box (1), dimensions such that the flange (33) extends from the interior surface (1400) of the box (1) to a position laterally beyond the front of the mouth (3).

The rear wall (26) is also adapted to accommodate a releasable fastener for fastening the faceplate (2) directly or indirectly, through the electrical instrumentality (15), to the box (1). Preferably, this consists of one or more apertures (1003) to accommodate screws (10).

Thus, the Electrical Box with Recessed Faceplate having a one-piece recessed faceplate has a box (1) adapted to accommodate a two-piece recessed faceplate (25), has no screws (10) or analogous components of another type of releasable fastener exposed within the box (1) behind the installed electrical equipment (15), and possesses no substantial gaps or apertures other than those designed to accommodate the installed electrical equipment (15) and screws (10) or components of another type of releasable fastener. The description to this point has concentrated upon the embodiments depicted in FIG. 1 through FIG. 4. Any embodiment utilizing the inventive features described in the first sentence of this paragraph would, however, fall within the scope of this invention, e.g., the cross section of the box (1) need not necessarily be rectangular.

Attached to the top (13) of the front portion (11) or to the top (5) of the rear portion (8) of the box (1), but preferably to the top (13) of the front portion (11) of the box (1), and also to the bottom (17) of the front portion (11) or to the bottom (6) of the rear portion (8) of the box (1), but preferably to the bottom (17) of the front portion (11) of the box (1), are projections (134) between which nails can be inserted to fasten the box (1) to a surface, preferably a stud.

As shown in FIG. 2, the sides (35) of the flange (33) optionally contain channels (36) running along the edge (37) of the flange (33) to accommodate longitudinal tabs (38) of a cover (39) so that the cover (39) can be removably placed over the Electrical Box with Recessed Faceplate. In the embodiment of FIG. 2, the lower portion (40) of the flange (33) contains one or more indentations (41) to accommodate the electrical cords, telephone lines, or cables of any electrical instrumentality that may be plugged into the receptacle (15).

The cover (39) preferably has a front surface (141), a top (42) connected to the front surface (141), and two sides (43) each of which is connected to the front surface (141) and to the top (42) to form a four-sided structure. The longitudinal tabs (38) extend inward from each side (43), and the top (42) functions as a stop to preclude the cover (39) from sliding below the flange (33).

The outer portion (24) of the two-piece recessed faceplate (25) is constructed just as is the one-piece recessed faceplate (2) except that such outer portion (24) does not have a rear wall (26) but instead has attached to each side (29) a longitudinal projection (201) extending inward having an aperture (44) to accommodate a screw (10) or other releasable fastener that will draw toward the box (1), and retain, the outer portion (24) of the two-piece recessed faceplate (25). This pulls the back side (34) of the flange (33) against the mounting surface.

The inner portion (45) of the two-piece recessed faceplate (25) is constructed the same as the one-piece recessed faceplate (2) except that it does not have the flange (33) but does possess the number of apertures (46), two apertures (46) in the case of screws (10), to accommodate the releasable fasteners that draw the outer portion (24) of the two-piece recessed faceplate (25) to the box (1).

The top (27), bottom (28), and two sides (29) for the outer portion (24) of the two-piece recessed faceplate (25) are sized so that they will slide along the inside of the top (27), bottom (28), and two sides (29), respectively, of the inner portion (45) in order that there will substantially be no gaps between these corresponding features.

Figure 4:
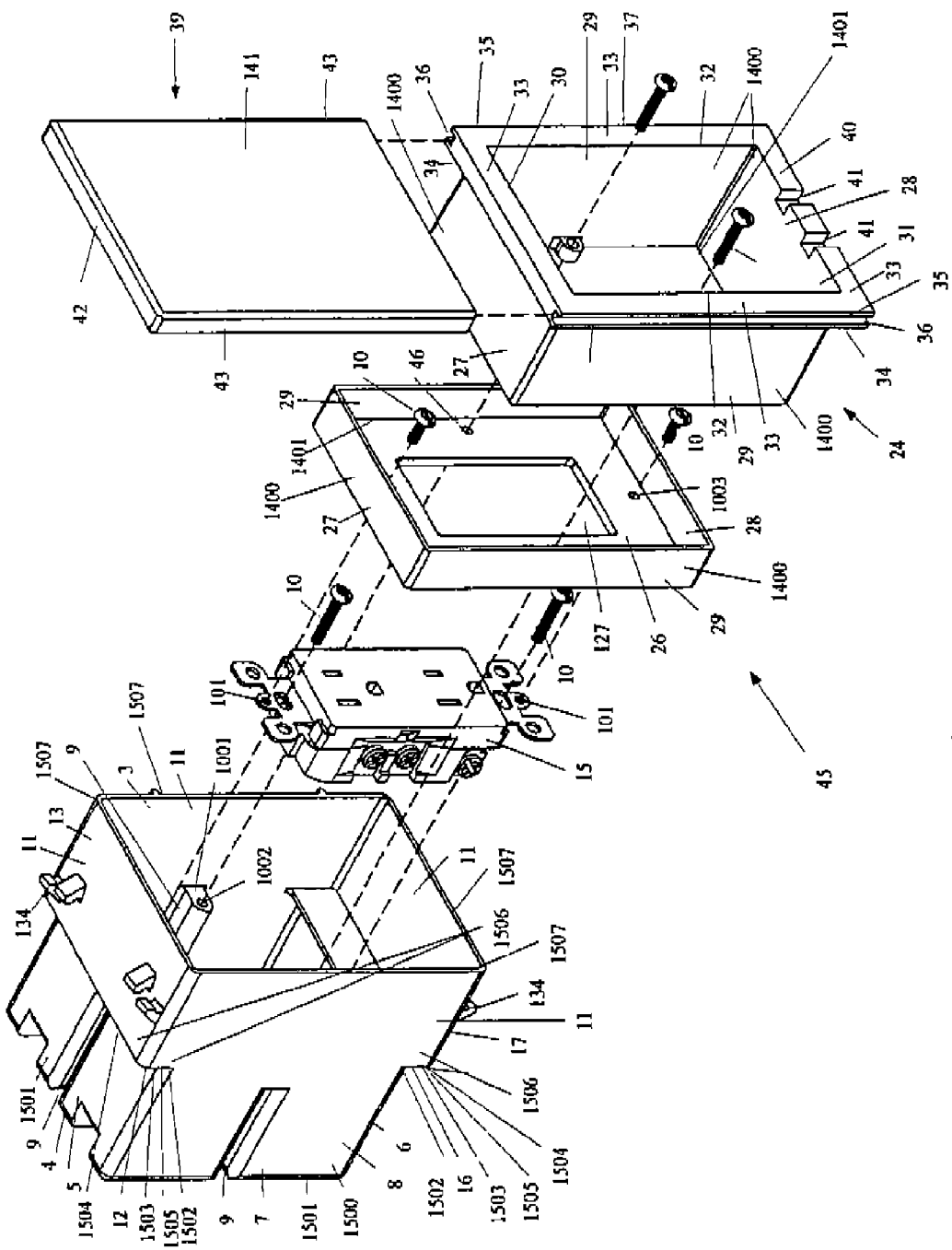
FIG. 4 is the same embodiment as that of FIG. 3 with the addition of a sliding cover.

As depicted in FIG. 4, the outer portion (24) of the two-piece recessed faceplate (25) optionally is designed, just as is the one-piece recessed faceplate (2), to have a cover (39).

Figure 5:
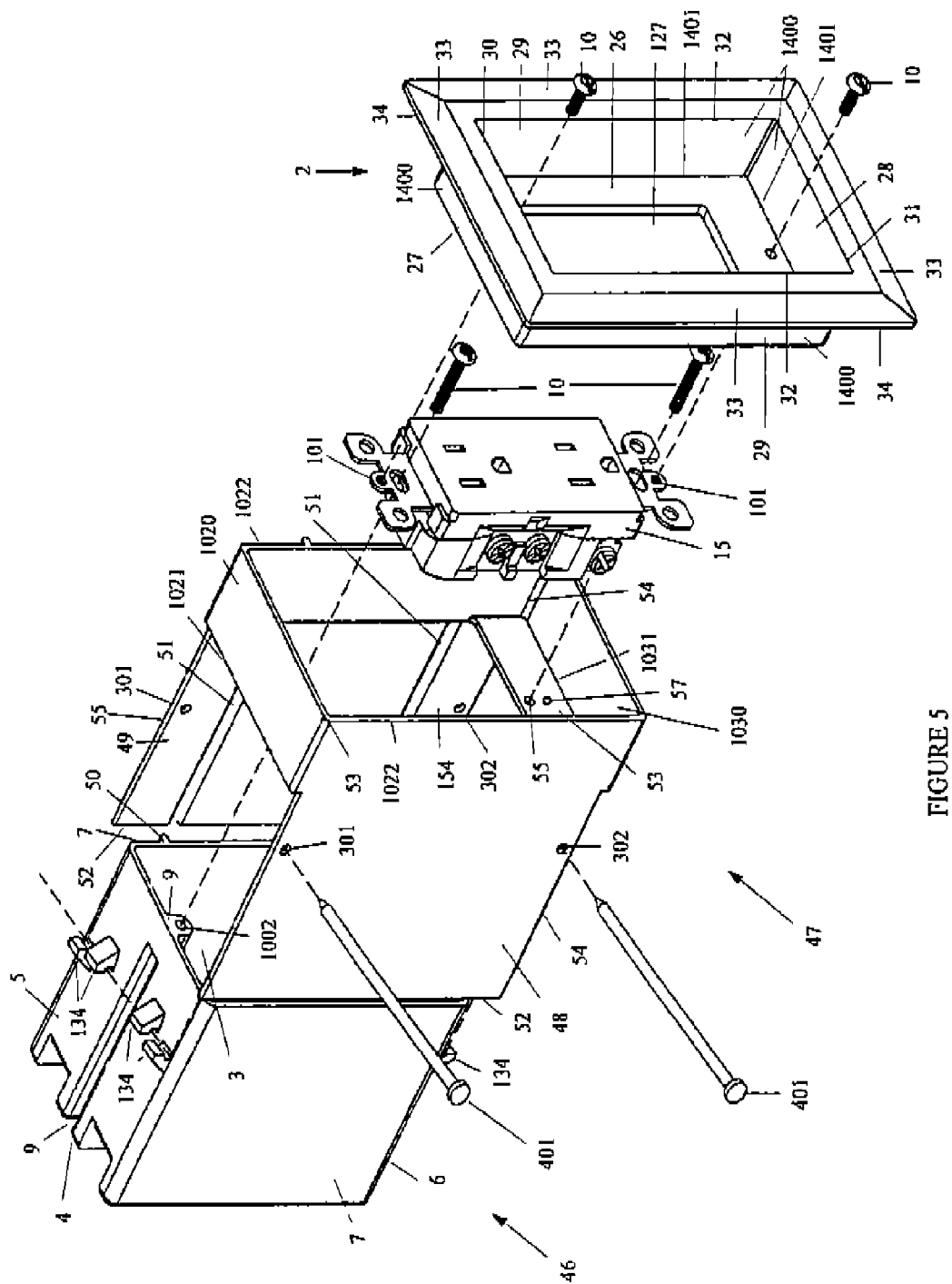
FIG. 5 shows an Electrical Box with Recessed Faceplate that is created by modifying a traditional electrical box.
Figure 6:
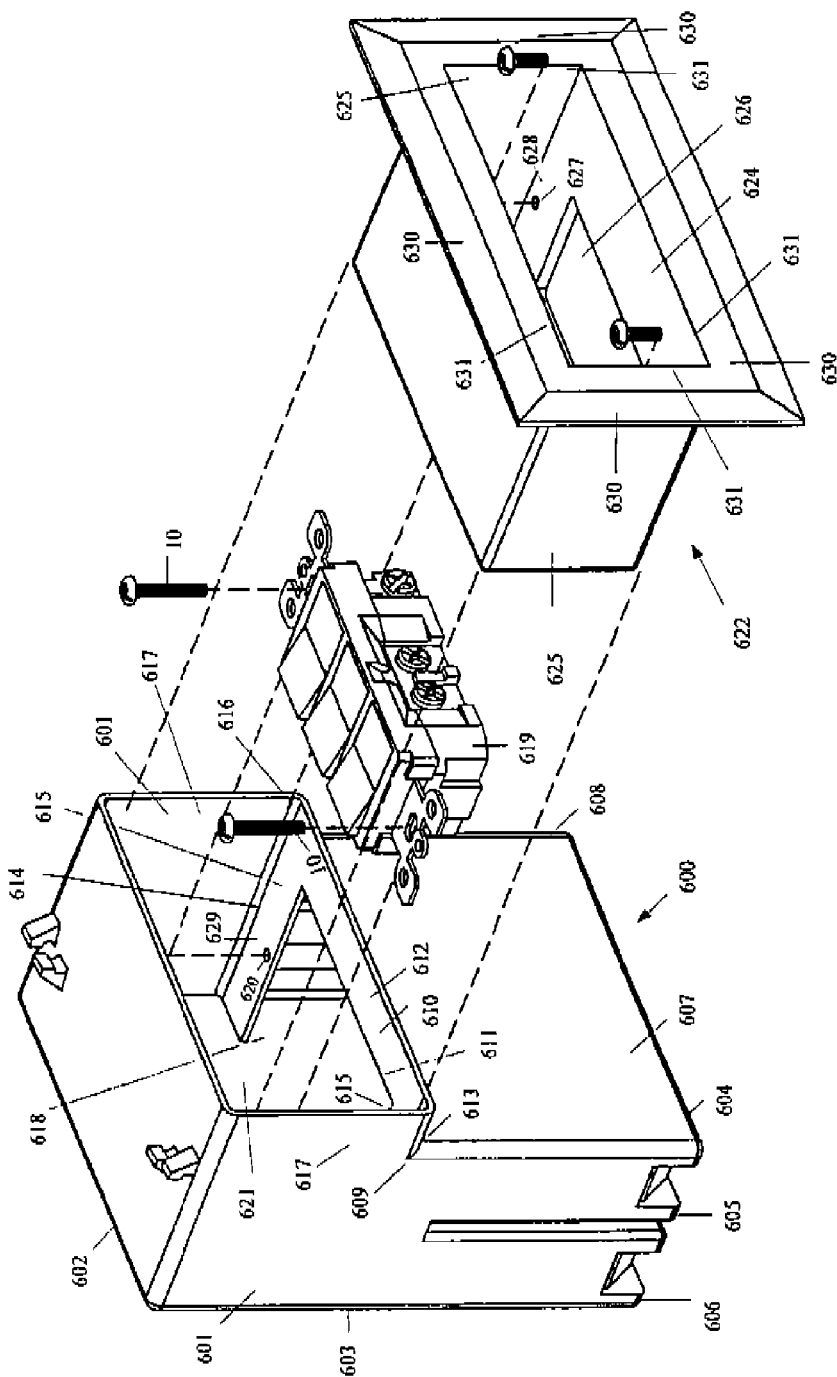
FIG. 6 portrays an Electrical Box with Recessed Faceplate for switches wherein the switches are to be oriented so that upon installation the faces of the switches will be other than parallel to the wall of building in which the electrical box is placed.

The one-piece recessed faceplate (2) is also utilized with the embodiment of FIG. 5, which employs a traditional electrical box (46).

An extender (47) is placed around the traditional electrical box (46) to create an electrical box that is designed to have the electrical instrumentality (15) located in essentially the same position as with the unmodified traditional electrical box (46) but having the electrical box extend beyond that position.

The extender (47) has a first side (48) and a second side (49) constructed to slide along the outside surface of the sides (7) of the traditional electrical box (46), preferably leaving no substantial gaps between the sides (7) of the traditional electrical box (46) and the sides (48, 49) of the extender (47). Because the traditional electrical box (46) has two projections (50) on the side (7) along which the second side (49) of the extender (47) slides, the second side (49) of the extender (47) contains two channels (51) to accommodate the projections (50).

At a distance, from the back (52) of the sides (48, 49) of the extender (47), greater than the distance between the open front (3) of the traditional electrical box (46) and the projections (134) to hold nails (401), and preferably a distance substantially equal to the distance between the open front (3) and the closed back (4) of the traditional electrical box (46), a wall (53) is attached to the sides (48, 49) and runs from the bottom (54) to the top (55) of the sides (48, 49) of the extender (47) and from the first side (48) to the second side (49) of the extender (47). The sides (48, 49) and the wall (53) of the extender (47) proceed both above and below the traditional electrical box (46). Each side (48, 49) contains an aperture (301) that will be above a height equal to the top (5) and an aperture (302) that will be below the level of the bottom (6) of a traditional electrical box (46), with such apertures (301, 302) also being at a position that will be in general alignment with the projections (134) when the extender (47) is placed on a traditional electrical box (46). The apertures (301, 302) then accommodate the nails (401) that go through the projections (134).

Contained within the wall (53) are one or more instrumentality apertures (154) to accommodate the electrical instrumentality (15). The one or more instrumentality apertures (154) can extend as far as desired toward the sides (48, 49), even reaching the sides (48, 49).

The wall (53) also has a lower aperture (55) and an upper aperture (56), placed so as to be generally aligned with the lower channel (9) and upper channel (9) of a traditional electrical box (46) when the extender (47) has been placed on a traditional electrical box (46), for screws (10) that will extend into the upper and lower channels (9) of the traditional electrical box (46) to fasten an electrical instrumentality (15) or a faceplate to the traditional electrical box (46). Optionally, below the lower aperture (55) is an aperture (57) to accommodate a screw (10) that extends through the wall (53) below the bottom (6) of the traditional electrical box (46). Similarly and optionally, above the upper aperture (56) is an aperture (59). Apertures (57, 59) accommodate screws (10) which are used to attach faceplates to the type of electrical instrumentality (15) depicted in FIG. 5, using threaded aperture (101) of the electrical instrumentality (15). The number and location of apertures for attaching a faceplate to an electrical instrumentality depend upon the particular electrical instrumentality (15) that is utilized.

Whether the attachment using apertures (55, 56) is for an electrical instrumentality (15) or the wall (53) is determined by whether the electrical instrumentality (15) is intended to be attached to the wall (53) or directly to the traditional electrical box (46). This is the same situation as for the new electrical box. If the electrical instrumentality (15) is intended to be attached directly to the traditional electrical box (46), the threaded apertures (1002) of the upper and lower channels (9) each accommodate a screw (10) for holding the electrical instrumentality (15) to the traditional electrical box (46), as illustrated in FIG. 5. Otherwise, the threaded apertures (1002) of the upper and lower channels (9) would be available to retain a screw (10) for holding the wall (53) to the traditional electrical box (46).

Furthermore, as is the case with traditional faceplates, attachment of an electrical instrumentality (15) to the wall (53) can be permanent or releasable.

An upper segment (1020) runs along and is attached to the top (1021) of the wall (53) between the sides (48, 49) of the extender (47) from the wall (53) to the front (1022) of the sides (48, 49) and is also attached to the top (55) of the sides (48, 49). Similarly, a lower segment (1030) runs along and is attached to the bottom (1031) of the wall (53) between the sides (48, 49) of the extender (47) from the wall (53) to the front (1022) of the sides (48, 49) and is also attached to the bottom (54) of the sides (48, 49).

Finally, a particular version of an Electrical Box with Recessed Faceplate is a switch box (600) which has two generally L-shaped sides (601), a back panel (602) running the length of and attached to a first end (603) of each L-shaped side (601), a bottom panel (604) attached to and running between the bottom (605) of the L-shaped sides (601) and also running along and attached to the bottom (606) of the back panel (602), a front panel (607) attached to a second end (608) of each L-shaped side (601) running between the L-shaped sides (601) from the bottom (605) of the L-shaped sides (601) to the vertex (609) of the L and also attached to the bottom panel (604), and a U-shaped ledge (610) having the inside (611) of the bottom (612) of the U-shaped ledge (610) attached to the top (613) of the front panel (607) and the outside (614) of the legs (615) of the U-shaped ledge (610) attached to the generally L-shaped sides (601) in substantial alignment with the inside edge (616) of the shorter leg (617) of the L.

Thus, an aperture (618) exists in the U-shaped ledge (610) to accommodate a switch (619). A threaded aperture (620) in each leg (615) of the U-shaped ledge (610) accommodates a screw (10) to hold the switch (619) in place.

A primary aperture (621), consequently, also exists above the front panel (607). An insert (622) having a top (623), bottom (624), and two sides (625) has an aperture (626) in the bottom (624) to accommodate the switch (619). The insert (622) slidably mounts within the primary aperture (621), i.e., above the U-shaped ledge (610). An aperture (627) in one or more ends (628) of the bottom (624) of the insert (622) is designed to be substantially aligned with one or more secondary threaded apertures (629) in the legs (615) of the U-shaped ledge (610) after the insert (622) has been placed into the primary aperture (621) in order to accommodate a screw (10) to hold the insert (622) in place.

Finally, a flange (630) extends from the outer edges (631) of the insert (622) generally perpendicular to the top (623), bottom (624), and two sides (625) of the insert (622). The flange (630) is designed to seat substantially against the mounting surface.

Whenever in the preceding discussion a threaded aperture has been mentioned, a non-threaded aperture could, instead, be used together with a threaded nut; and the term "threaded aperture" is intended to encompass such structure.

INDUSTRIAL APPLICABILITY

The way in which the Electrical Box with Recessed Faceplate is capable of exploitation in industry and the way in which the Electrical Box with Recessed Faceplate can be made and used are obvious from the description and the nature of the Electrical Box with Recessed Faceplate.

I claim:

1. An Electrical Box with Recessed Faceplate, which comprises:
   a faceplate (2) comprising:
      a rear wall (26) with a perimeter (1401) and a cross-sectional shape, the rear wall (26) containing one or more instrumentality apertures (127) and having a means for accommodating a releasable fastener for attaching said faceplate (2) to an electrical instrumentality (15);
      a flange (33); and
      an interior surface (1400) projecting generally forward from the rear wall (26) and connecting the rear wall (26) to the flange (33); and
   a box (1) comprising:
      a rear wall (4) having a perimeter (1501);
      a lateral surface (1500) attached to and projecting generally forward from the perimeter (1501) of the rear wall (4) and having a top (5) containing a channel (9), a bottom (6) containing a channel (9), and sides (7) each containing a channel (9), with each channel (9) having an interior end (1001);
      a connecting wall (1503) having a first end (1502) attached to the lateral surface (1500), the connecting wall (1503) having sides (1505) and a second end (1504) and said connecting wall (1503) extending generally outward from the lateral surface (1500); and
      a front portion (11) having a first end (1506) attached to and projecting generally forward from the sides (1505) and the second end (1504) of the connecting wall (1503), the front portion (11) containing the interior ends (1001) of the channels (9), the front portion (11) having a second end (1507) forming an open mouth (3), the front portion (11) having substantially the same cross-sectional shape as does the rear wall (26) of said faceplate (2), and the front portion (11) having dimensions such that the flange (33) of the faceplate (2) extends from the interior surface (1400) to a position laterally beyond the front of the mouth (3); and
      a means for accommodating a releasable fastener for attaching said box (1) to an electrical instrumentality (15).

2. The Electrical Box with Recessed Faceplate as recited in claim 1, wherein:
   the means for accommodating a releasable fastener for attaching said faceplate (2) to an electrical instrumentality (15) which means comprises part of the faceplate (2) is one or more apertures (1003) in said faceplate (2) as well as one or more apertures (19, 20) in the connecting wall (1503) when the fastener for attaching said faceplate (2) to an electrical instrumentality (15) is a screw (10); and
   the means for accommodating a releasable fastener for attaching said box (1) to an electrical instrumentality (15) is a covered interior end (1001) having a threaded aperture (1002) for the channel (9) on the top (5) of the lateral surface (1500) of the box (1) and a covered interior end (1001) having a threaded aperture (1002) for the channel (9) on the bottom (6) of the lateral surface (1500) of the box (1).

3. The Electrical Box with Recessed Faceplate as recited in claim 2, wherein:
   said faceplate (2) and said box (1) each have a rectangular cross section.

4. The Electrical Box with Recessed Faceplate as recited in claim 3, further comprising:
   a cover (39) having a front surface (141), a top (42) connected to the front surface (141), two sides (43) each of which is connected to the front surface (141), and longitudinal tabs (38) extending inward from each side (43); and
   wherein said flange (33) has sides (35), each side (35) containing a channel (36) running along an edge (37) of said flange (33) to accommodate the longitudinal tabs (38) of said cover (39).

5. The Electrical Box with Recessed Faceplate as recited in claim 1, wherein:
   said faceplate (2) and said box (1) each have a rectangular cross section.

6. The Electrical Box with Recessed Faceplate as recited in claim 5, further comprising:
   a cover (39) having a front surface (141), a top (42) connected to the front surface (141), two sides (43) each of which is connected to the front surface (141), and longitudinal tabs (38) extending inward from each side (43); and
   wherein said flange (33) has sides (35), each side (35) containing a channel (36) running along an edge (37) of said flange (33) to accommodate the longitudinal tabs (38) of said cover (39).

7. An Electrical Box with Recessed Faceplate, which comprises:
   a faceplate (2) comprising:
      a rear wall (26) with a perimeter (1401) and a cross-sectional shape, the rear wall (26) containing one or more instrumentality apertures (127) and having a means for accommodating a fastener for attaching said faceplate (2) to an electrical instrumentality (15) as well as a means for accommodating a releasable fastener;
      a flange (33); and
      an interior surface (1400) projecting generally forward from the rear wall (26) and connecting the rear wall (26) to the flange (33); and
   a box (1) comprising:
      a rear wall (4) having a perimeter (1501);
      a lateral surface (1500) attached to and projecting generally forward from the perimeter (1501) of the rear wall (4) and having a top (5) containing a channel (9), a bottom (6) containing a channel (9), and sides (7) each containing a channel (9), with each channel (9) having an interior end (1001);
      a connecting wall (1503) having a first end (1502) attached to the lateral surface (1500), the connecting wall (1503) having sides (1505) and a second end (1504) and said connecting wall (1503) extending generally outward from the lateral surface (1500); and
      a front portion (11) having a first end (1506) attached to and projecting generally forward from the sides (1505) and the second end (1504) of the connecting wall (1503), the front portion (11) containing the interior ends (1001) of the channels (9), the front portion (11) having a second end (1507) forming an open mouth (3), the front portion (11) having substantially the same cross-sectional shape as does the rear wall (26) of said faceplate (2), and the front portion (11) having dimensions such that the flange (33) of the faceplate (2) extends from the interior surface (1400) to a position laterally beyond the front of the mouth (3); and
      a means for accommodating a releasable fastener for attaching said box (1) to said faceplate (2).

8. The Electrical Box with Recessed Faceplate as recited in claim 7, wherein:
- the means for accommodating a releasable fastener in the rear wall (26) of said faceplate (2) is one or more apertures (1003) in the rear wall (26) of said faceplate (2) when the releasable fastener is a screw (10); and
- the means for accommodating a releasable fastener for attaching said box (1) to said faceplate (2) is a covered interior end (1001) having a threaded aperture (1002) for the channel (9) on the top (5) of the lateral surface (1500) of the box (1) and a covered interior end (1001) having a threaded aperture (1002) for the channel (9) on the bottom (6) of the lateral surface (1500) of the box (1) when the releasable fastener is a screw (10) that will pass through the one or more apertures (1003) in the rear wall (26) of said faceplate (2).

9. The Electrical Box with Recessed Faceplate as recited in claim 8, wherein:
- said faceplate (2) and said box (1) each have a rectangular cross section.

10. The Electrical Box with Recessed Faceplate as recited in claim 9, further comprising:
- a cover (39) having a front surface (141), a top (42) connected to the front surface (141), two sides (43) each of which is connected to the front surface (141), and longitudinal tabs (38) extending inward from each side (43); and
- wherein said flange (33) has sides (35), each side (35) containing a channel (36) running along an edge (37) of said flange (33) to accommodate the longitudinal tabs (38) of said cover (39).

11. The Electrical Box with Recessed Faceplate as recited in claim 7, wherein:
- said faceplate (2) and said box (1) each have a rectangular cross section.

12. The Electrical Box with Recessed Faceplate as recited in claim 11, further comprising:
- a cover (39) having a front surface (141), a top (42) connected to the front surface (141), two sides (43) each of which is connected to the front surface (141), and longitudinal tabs (38) extending inward from each side (43); and
- wherein said flange (33) has sides (35), each side (35) containing a channel (36) running along an edge (37) of said flange (933) to accommodate the longitudinal tabs (38) of said cover (39).

* * * * *